Figure 1:
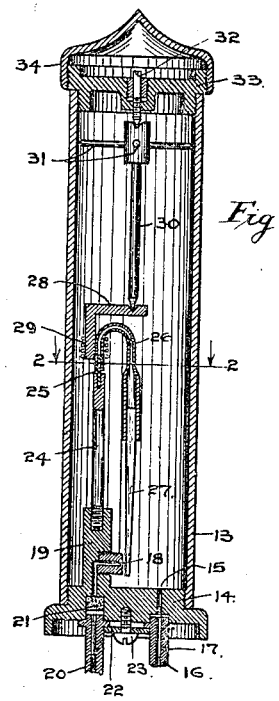

No. 837,260. PATENTED NOV. 27, 1906.
E. W. COMFORT.
APPARATUS FOR CONTROLLING TEMPERATURES.
APPLICATION FILED JULY 28, 1902.

2 SHEETS—SHEET 1.

Fig. 1ª.

WITNESSES.

INVENTOR
Edward W. Comfort
BY Jones & Addington
ATTORNEYS.

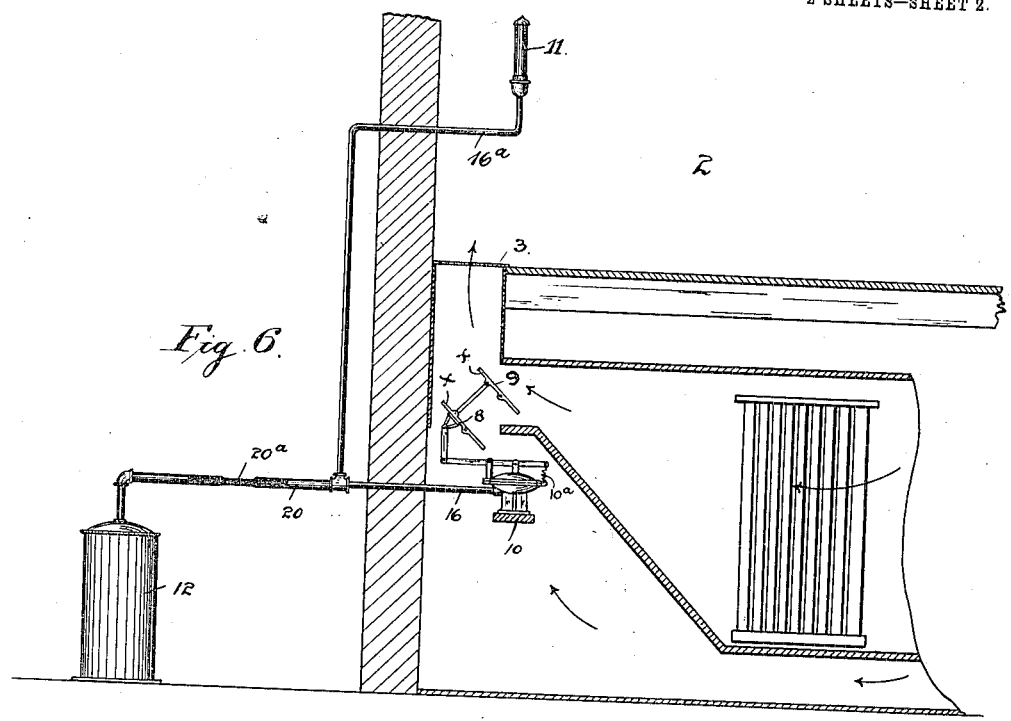
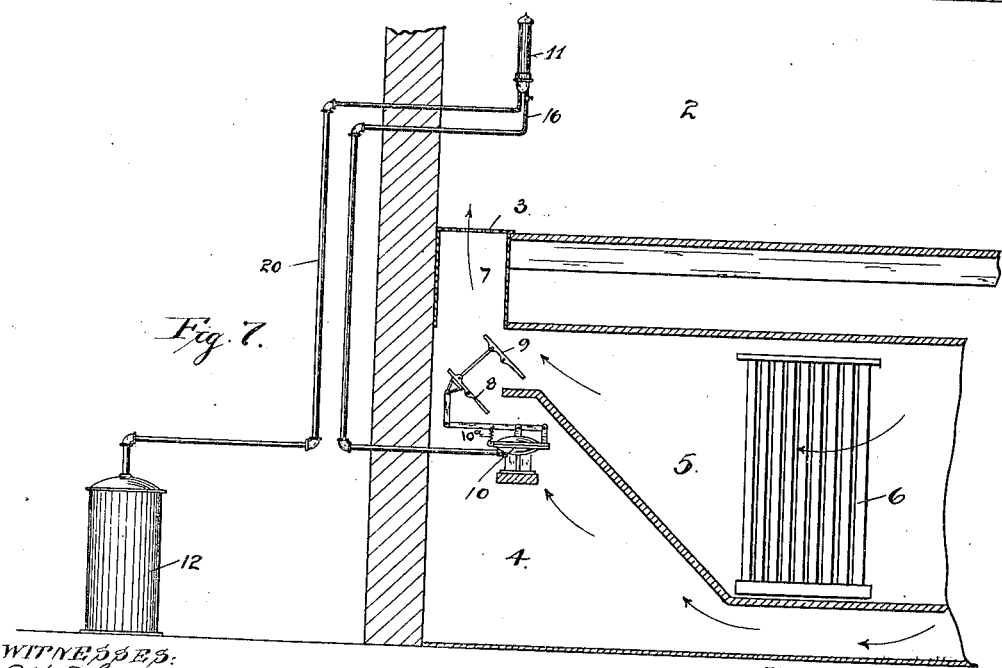

UNITED STATES PATENT OFFICE.

EDWARD W. COMFORT, OF CHICAGO, ILLINOIS, ASSIGNOR TO NATIONAL REGULATOR COMPANY, OF CHICAGO, ILLINOIS, A CORPORATION OF ILLINOIS.

APPARATUS FOR CONTROLLING TEMPERATURES.

No. 837,260.                Specification of Letters Patent.            Patented Nov. 27, 1906.

Application filed July 28, 1902. Serial No. 117,337.

*To all whom it may concern:*

Be it known that I, EDWARD W. COMFORT, a citizen of the United States, residing at Chicago, in the county of Cook and State of Illinois, have invented a certain new and useful Improvement in Apparatus for Controlling Temperatures, of which the following is a full, clear, concise, and exact description, reference being had to the accompanying drawings, forming a part of this specification.

My invention relates to apparatus for controlling temperatures in buildings.

There is commonly employed in apparatus of this general type a fluid-pressure motor to directly actuate the dampers controlling the air-supply to the room whose temperature is to be governed, a source of fluid-pressure, such as a tank filled with compressed air, and a thermostat located in the said room and suitably connected with the source of supply and the motor, so as to control the operation of the latter in accordance with the variations of temperature in the room. It is often desirable to modify the action imparted by the thermostat to the controlling-valves, so as to accelerate the same or so as to retard the same, the first modification being sought in connection with those systems of heating where a quick action of dampers or valves is desired and the latter where a slow motion of the dampers is preferred.

My invention contemplates the provision of means in connection with a thermostatic element for accomplishing the desired modification of the thermic action. This means consists in so combining with a thermostatic element a tube having such a cross-section and form that when subjected to changes in pressure, either externally or internally applied, a transverse movement is imparted to a portion thereof such that the motion imparted by the thermostat to the actuating parts of the device is suitably modified. The thermostatic element preferably takes the form of a tube forming a hollow chamber, in which tube the said curved tube is located, the two parts coöperating in the control of the valve or valves within the thermostatic tube, so that the action thereof is controlled and modified. It will be understood, however, that the devices may take other forms and be combined in other ways.

The invention further contemplates so constructing and arranging the apparatus that but one pipe or tube extends between the thermostatic device in the room and the motor or other apparatus, thus effecting a considerable saving in installation over the usual "two-pipe" systems, in which the thermostat is connected by two pipes with the other apparatus.

The invention, together with its further objects and advantages, is more fully disclosed in the detailed description and claims.

Figure 2:
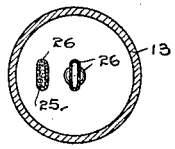
Figure 3:
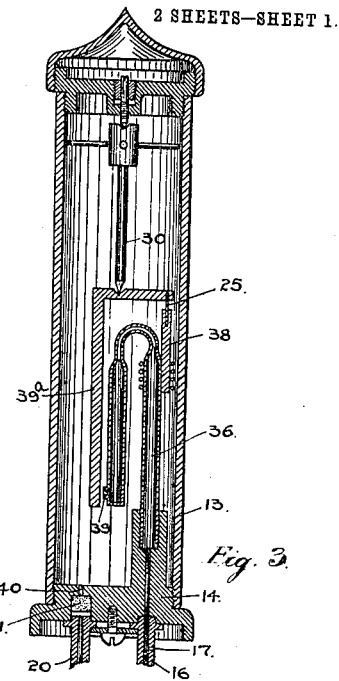
Figure 4:
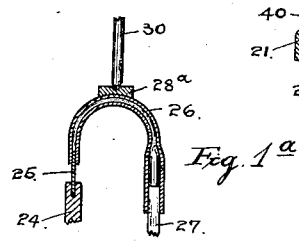
Figure 4:
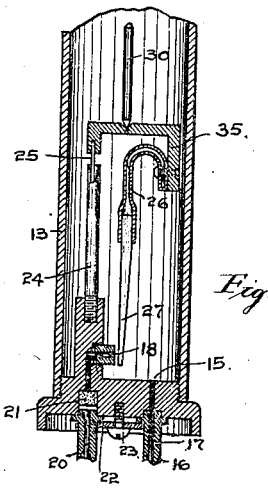
Figure 5:
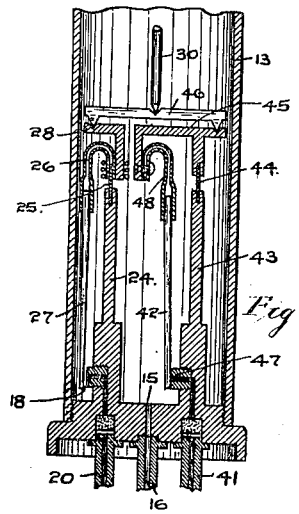

In the accompanying drawings, in which the same reference characters designate like parts throughout the several views, Figure 1 is a longitudinal section of a thermostatic device employing my invention. Fig. 1ᵃ is a sectional view of a modified arrangement for securing the block containing the seat for rod 30 to the flexible tube 26. Fig. 2 is a cross-section of the same on line 2 2 of Fig. 1. Fig. 3 is a longitudinal view of a slightly different arrangement of the device. Fig. 4 is a like arrangement of the device. Fig. 5 is a similar view of still a different form. Fig. 6 is a diagrammatic view of my "one-pipe" system, and Fig. 7 is a similar view of the usual two-pipe system.

Referring first to Fig. 7, 2 designates the room to be heated; 3, the register opening into the room 2; 4, the cold-air room or passage; 5, the hot-air room or passage heated by the steam-coils 6 or in other desired manner, and 7 the duct for the admission of the hot and cold air opening into the rooms through the grate 3. The air in the duct 7 is tempered or mixed in the desired proportions of hot and cold air by the dampers 8 and 9, suitably connected together, so that as one closes the other opens and operated by the pressure-motor 10, which is controlled by the thermostatic device 11; placed in the room 2, a source of fluid-pressure 12 being also connected with the said device to furnish power for the operation of the motor 10.

As will be apparent from an inspection of the figures, it is not desirable in ordinary temperature regulation to entirely close either the hot or cold air duct, for that would throw the cold or hot air alone into the room. An intermediate position of the dampers, so as to suitably temper the air introduced into the room, is therefore ordinarily desired, and it is for this method of working that my invention is especially adapted.

Having reference to Figs. 1 and 2, 13 indicates a tube, preferably of hard rubber, but of any material responsive to temperature changes. A plug 14 is screwed into the lower end of the tube 13 and is provided with a port 15, connecting with a tube 16, leading to the motor, said tube having a leak 17 of smaller cross-section than the bore of the tube. A second port 18 is formed in the side of a projection 19, formed on the base of plug 14, said port connecting with pipe 20, leading from the pressure-tank, a suitable filter 21 being provided in the passage to said port and the pipes 16 and 20 being held in place by the plate 22 bearing upon flanges formed on the pipes and by screw 23 or in any desired manner. A standard 24 is mounted upon said projection and hingedly supports, by means of the flexible spring 25, a hollow longitudinally-curved tube 26. This tube is so constructed and of such a cross-section that when subjected to variations in pressure, either external or internal, its longitudinal curvature is changed. Tubes of this character are in common use in connection with steam-gages, &c., and the structure and operation thereof are well known in the art. Fig. 2 shows the preferred cross-section of the tube employed in my device, though any other form capable of accomplishing the desired results may be employed. A valve member 27 is carried by the free end of said tube and serves to control the port 18. An angle-piece or lever 28 is secured to the tube 26, as by wrapping wire about the same, as shown at 29, and soldering all together. The lower and pointed end of the rod 30 bears on a seat in the angle-piece 28 and has at its upper end an enlargement, through which pass horizontal cross-arms 31 at right angles to each other, which serve to keep the rod 30 centered. The upper end of the rod 30 or a block carried thereby is provided with a depression, into which fits the pointed end of an adjustable screw-pin 32, carried by the plug 33, fitting in the other end of tube 13 and bearing the ornamental cap 34.

When the tube 13 shortens in response to a decrease in temperature in the room, the tendency is for the part 27 to close the port 18; but such closure reduces the pressure within the tube, owing to the leak 17, whereupon the walls of the tube 26 strive to expand and regain their normal form, which tends to straighten the tube, thus acting in opposition to the thermostatic element to retard the action of arm 27 in closing the port 18. Conversely, when the temperature of the room rises and the thermostat member lengthens, the tension of spring 25 tends to move valve 27 away from port 18; but this causes a rise of pressure within the tube 13, thus collapsing the walls of the tube 26 and causing it to increase its curvature and tending to prevent the outward movement of the valve, whose action is thus again retarded. By this arrangement it will be noted that the tube 26 modifies the action of the arm 27 in opening and closing the port 18 without affecting the movement of the thermostatic element, which is thereby permitted to move unimpeded throughout its entire range of travel when the temperature changes. It will thus be noted that during normal operation the part 27 assumes a position wherein a definite quantity of air is permitted to pass through the port 18 and escape to the atmosphere through the leak 17 in the pipe 16. If the temperature increases, the tube 13 expands, permitting the part 27 to open the port 18, and this permits a greater quantity of air to escape through the port 18, and as this greater quantity of air cannot escape through the leak 17 with sufficient rapidity a quantity thereof passes to the motor-chamber through the pipe 16, thereby moving the diaphragm of the motor. The increased pressure in the pipe 16, caused by the admission of the increased quantity of air thereto and the inability thereof to escape with sufficient rapidity, causes an increase of pressure within the tube 13. This pressure acts upon the Bourdon tube 26 and causes a movement of the part 27 in a direction which closes the port 18. This Bourdon tube thus constitutes a reactive device, which serves to prevent the opening of the port 18 upon an increase of temperature except for a brief period. Likewise a decrease of temperature causes the tube 13 to contract, and this moves the part 27 in a direction to close the port 18, thereby diminishing the quantity of air supplied to the pipe 16, and accordingly a quantity of air in the motor-chamber escapes to the atmosphere through the leak 17, thereby causing a movement of the diaphragm of the motor in an opposite direction. This decreases the pressure in the tube 13, and the Bourdon tube reacts to move the part 27 in a direction to open the port 18. When, therefore, such a device is used in connection with the system described with reference to Fig. 7, the desired gradual operation of the motor and dampers is secured, the pressure in the pipe 16 and the motor 10 being at all times regulated by the thermostatic device 11 and the operation of the motor in either direction being checked nearly as soon as started, causing the dampers 8 and 9 to maintain an intermediate position, whereby the air admitted to the room is suitably tempered.

Fig. 1ª shows a modification in the method of providing a bearing-point for the rod 30 for the purpose of the actuation of the valve-lever. In this modification a block of metal 28ª is soldered directly to the upper side of the wall of the flexible tube 26, and a seat is provided in the upper face of said block for the pointed end of the rod 30.

Fig. 4 shows substantially the same arrangement as Fig. 1, except that the hollow tube 26 is arranged for accelerating action, due to the tube 13, such an arrangement being desirable in some systems of temperature regulation—for example, in steam-heating plants—where it is desirable that the valves be quickly opened and quickly closed. In this form of device the elbow-lever 35 is flexibly mounted upon the spring 25, while its opposite end is bolted, riveted, or otherwise secured to the tube 26, the rod 30 bearing in a seat in its upper side. When, now, the temperature falls and the tube 13 shortens, the valve 27 moves toward and partially closes the port 18. This reduces the pressure within the tube 13, which causes tube 26 to tend to regain its normal form, thus decreasing its curvature and also tending to move arm 27 toward port 18, the two effects being therefore added. The reverse acceleration also takes place, for when the tube 13 lengthens, thus moving arm 27 away from port 18, more air rushes in from the supply-pipe, causing the pressure within the tube 13 to rise and causing the walls of the tube 26 to bend or flex, whereby its curvature is increased and arm 27 is moved away from the port, thus increasing the opening.

Fig. 3 shows a modification in which the outlet is formed through the flexible tube itself. The supply-pipe opens by port 40 into the tube 13. The tube 36 is mounted on the projection formed on the plug 14 and is connected with the pipe 16. The bent portion of the tube is of irregular cross-section with flexible walls, as before described, and a port 39 is formed in its end. The valve-lever 39a has its short arm secured by the spring 25 to the post 38, secured to the upper part of the straight rigid portion of the tube 36. The pin 30 bears upon the valve-lever, as shown. When the tube contracts, the end of the long arm of the valve-lever is moved toward the port 39. The closing of this port causes the pressure within tube 13 to rise, thus collapsing the walls of the bent portion of the tube 36, causing it to curve still more, which moves the port 39 away from the lever 39a, whereby the closing of the port is retarded. When the tube 13 expands, the action is likewise retarded. It is apparent that by supporting the valve-lever on the opposite side of the center of the tube on a separate post a corresponding quick action is obtained.

Fig. 5 shows the application of this device to a double-valve thermostat in which the leak 17 is not employed, the connections being arranged to give slow motion to the valves. In this form the same valve mechanism for the inlet-port 18 as in Fig. 1 is provided, and a similar mechanism is furnished for the outlet-port 47, except that the valve-lever 45 is fulcrumed upon a stronger spring 44, carried by post 43, than the spring 25, carried by post 24. A tube 48, similar to tube 26, is provided and carries the valve 42. A lever 46 bears upon the valve-levers 28 and 45, as shown, and is itself acted upon by rod 30. When the tube 13 contracts with cold, the lever 46 first actuates valve-lever 27, owing to its weaker spring, to close port 18a. The valve-arm 42 then begins to open the port 47 to the atmosphere, which immediately reduces the pressure within the tube 13, which reduced pressure tends to straighten tubes 26 and 48, so that the opening of the port 47 is retarded and the dampers are operated with a slow motion. In the reverse operation the lever 42 first closes before port 18 begins to open. As soon as the air rushes in through port 18 the tubes 26 and 48 are collapsed and tend to curve more, and thus retard the opening of the port 18.

In Fig. 6 I have shown the one-pipe system before referred to. In this case the source of supply 12 is connected directly with the motor 10 by means of pipes 20 and 16. From an intermediate point of said connection the single pipe 16a leads to the thermostat 11, which, as before described, is placed in the room 2 the temperature of which is to be controlled. In the pipe 20, between the branch leading to the thermostat and the source of supply, a restricted passage 20a is provided, said passage, as shown, consisting merely of a reduction in diameter of the pipe 20; but it is apparent that any other means for producing the restricted passage may be employed—as, for instance, an adjustable valve. With this arrangement the pipe 16a is connected directly with the interior of the thermostatic tube 13, as, for instance, with the port 40 in Fig. 3 or the port 15 in Fig. 4—while the other opening, which is controlled by the valve, opens directly to the atmosphere.

The operation of the apparatus when arranged in this manner is as follows: Considering first the arrangement shown in Fig. 3, when the temperature in the room exceeds the desired limit the tube 13 of the thermostat is expanded and permits the valve-lever to open the outlet-port 39. This will permit the air in the motor, in the pipes 16 and 16a and in the tube 13 to escape faster than it can be supplied through the restricted passage 20a, so that the motor will operate in a suitable direction to open the cold-air damper and close the hot-air damper. The reduction of the pressure within the tube 13, however, permits the flexible tube 36 to expand and reassume its normal form, which tends to straighten the same, and thereby to close port 39, which action serves to retard and check the movement of the motor, so that the dampers will assume an intermediate position. Likewise when the temperature of the room cools the tube 13 contracts, causing the valve-lever to tend to close the port 39, which causes the pressure in the pipes 16 and 16ª and in the tube 13 to increase, and therefore to operate the motor in the proper direction to control the heat-supply, and at the same time the tube 36 is responsive to the increased pressure and serves to move its port 39 away from the valve-lever 39ª, whereby the closing of the said port is retarded and the increase in pressure, which causes the dampers to alter their position, is checked. The same action will result from the use of the connections shown in Fig. 4, whereby when the tube expands the valve-lever tends to open the port 18, but the decrease of pressure in the tube 13 tends to straighten the tube 26 and to close the port 18. The reverse action takes place when the tube 13 contracts, the valve-lever tending then to close port 18, while the increased pressure tends to prevent closing the same. It will thus be seen that with the one-pipe system I obtain the same action as in the two-pipe system shown in Fig. 7 and previously described, the one-pipe system resulting in a considerable saving in the expense of installation. The restricted passage 20ª will of course be adjusted to suit the varying conditions of use.

If it is desired to use the one-pipe method to accelerate the action of the heat-supply, it is only necessary to reverse the connections to the thermostat, so as to bring the air into the thermostat through the open connection and have it escape through the port controlled by the valve. This reverses the action of the valve, accelerating it instead of retarding it.

It will therefore be seen that this device comprises a perfect pressure-reducer, and while a movement of the parts has been referred to as taking place it is evident that such conditions and variations of temperature may occur that the functions of the device are continually exercised in keeping the dampers stationary.

While I have spoken of "a valve" in the claims, it will be understood that not only is a single valve contemplated, but also any valve combination or valve mechanism serving to accomplish substantially similar results.

Having described my invention, what I claim as new, and desire to secure by Letters Patent, is—

1. The combination with a thermostatic device comprising an element responsive to variations in temperature and an associated pressure-chamber, of a source of fluid-supply connected with said chamber, a valve mechanism governing the variations of pressure within said chamber, and a part located wholly within said chamber and responsive to the variations of pressure therein, the operation of said valve mechanism being controlled by the conjoint action of said part and said thermostatic element.

2. The combination with a thermostat and an associated chamber within which variations of pressure take place, of a suitable valve mechanism actuated by the thermostat, and a curved tube within said chamber responsive to the changes of pressure therein to vary its longitudinal curvature, said tube being arranged to modify the action of said thermostat upon said valve mechanism, substantially as described.

3. The combination with a thermostatic element constituting a hollow chamber in which the pressure varies, of a part subjected to the variations of pressure within said chamber and responsive to said variations, a valve mechanism actuated by the said thermostatic element, and means for causing said part to modify the action of said thermostatic element upon said valve mechanism.

4. The combination with a thermostat constituting a hollow chamber in which the pressure varies, of a curved bent tube subjected to the variations in pressure in said thermostatic chamber and responsive to said variations to change its longitudinal curvature, and a valve actuated by the thermostat, said curved bent tube serving to modify the action of said thermostat upon said valve.

5. The combination with a thermostatic tube in which the pressure varies, of a suitable valve operated thereby, and a curved tube subjected to changes in pressure in said thermostatic tube and responsive to said changes to vary its longitudinal curvature, said curved tube being arranged to modify the action imparted to said valve by the thermostatic tube.

6. The combination with a thermostatic tube forming a hollow chamber in which the pressure varies and having a port-opening therein, of a valve controlling said port, a curved tube responsive to variations in pressure to vary its longitudinal curvature located within said thermostatic tube, said curved tube serving to modify the movement imparted to the valve by the thermostatic tube.

7. The combination with a thermostatic tube forming a hollow chamber in which the pressure varies, said chamber having a port or opening therein, of a valve for said port operated by said thermostatic tube, a curved tube located within said thermostatic tube, subjected to the changes in pressure therein and responsive to said changes to effect its longitudinal curvature and connecting with the valve mechanism so as to retard the action imparted to the valve by the thermostatic tube.

8. In an apparatus for controlling temperature, the combination with a source of fluid-pressure, of a motor actuated thereby and controlling suitable apparatus, an inlet-pipe extending directly between said source of fluid-pressure and said motor, a pipe extending from said motor to a thermostat, a valve mechanism actuated by said thermostat and controlling the escape of fluid from said motor, and a reactive device serving to govern the operation of said valve mechanism to cause a gradual movement of the apparatus controlled by the motor.

9. In an apparatus for controlling temperature, the combination with a source of fluid-pressure, of a motor actuated thereby and controlling suitable apparatus, an inlet-pipe extending directly between said source of fluid-pressure and said motor, a pipe extending from said motor to a thermostat, a valve mechanism actuated by said thermostat and controlling the exit from said motor, and a reactive device serving to govern the operation of said valve mechanism to cause a gradual movement of the apparatus controlled by the motor, said inlet-pipe having at one point a cross-section of less area than the exit from the motor.

10. In an apparatus for controlling temperature, the combination with a fluid-pressure motor, of a source of fluid-supply connected directly with said motor, a thermostat, a valve mechanism controlled by said thermostat, means responsive to the variations in fluid-pressure for modifying the movement of said valve mechanism without affecting the movement of said thermostat, and a single pipe connecting said valve mechanism with the other apparatus.

11. In an apparatus for controlling temperature, the combination with a fluid-pressure motor, of a source of supply to furnish power for the motor, a thermostat, a valve actuated by said thermostat, means responsive to the variations in fluid-pressure for modifying the movement of said valve without affecting the movement of said thermostat, and a single tube or pipe connecting the other apparatus with said valve, the connection between the source of supply and the motor having at one point a cross-section of less area than the opening to the chamber controlled by said thermostat.

12. The combination with a thermostatic tube forming a hollow chamber in which the pressure varies, of a valve controlled by said tube, a connecting-rod for connecting said tube and said valve, means for guiding said rod, and a part responsive to changes in fluid-pressure in said tube to modify the action imparted to the valve by the thermostatic tube.

13. The combination with a thermostatic tube forming a hollow chamber in which the pressure varies, of a valve controlled by said tube, a connecting-rod for connecting said tube and said valve, means for guiding said rod, and a part responsive to the changes in fluid-pressure in said tube to retard the action imparted to the valve by the thermostatic tube.

14. The combination with a heat-responsive element and an associated chamber, of a valve mechanism governed thereby, a fluid-pressure supply, said valve mechanism controlling the pressure in said chamber from said fluid-supply, and means responsive to changes of fluid-pressure in said chamber for modifying the action of said valve mechanism without affecting the heat-responsive element.

15. The combination with a thermostatic element constituting a hollow chamber, of a valve mechanism controlled thereby, a fluid-pressure supply, said valve mechanism controlling the pressure within said chamber from said fluid-supply, and means located within said chamber and responsive to the variations in fluid-pressure therein for modifying the action of said valve mechanism without affecting the movement of said thermostatic element.

16. The combination with a thermostatic element having an associated chamber, of a valve actuated by said thermostatic element, a fluid-pressure supply, said valve controlling the pressure in said chamber from said fluid-supply, and a sealed bent tube within said chamber responsive to changes of pressure in the chamber, said sealed bent tube serving to modify the action of said valve without affecting the movement of said thermostatic element.

17. The combination with a suitable source of fluid under pressure, of a motor actuated thereby and connected with a suitable valve, damper or like part, a thermostatically-actuated valve for controlling the fluid-pressure in the motor, and a reactive device for modifying the movement of said thermostatically-actuated valve to produce a gradual movement of the valve, damper or like part, said reactive device being constructed and arranged to permit the thermostatic element to move unimpeded throughout its entire range in response to temperature changes.

In witness whereof I have hereunto subscribed my name in the presence of two witnesses.

EDWARD W. COMFORT.

Witnesses:
C. B. CAMP,
W. CLYDE JONES.